(12) United States Patent
Rudrapatna et al.

(10) Patent No.: US 12,729,646 B2
(45) Date of Patent: Sep. 8, 2026

(54) GAS TURBINE ENGINE FUEL ATOMIZER SHROUD COOLING

(71) Applicant: HONEYWELL INTERNATIONAL INC., Charlotte, NC (US)

(72) Inventors: Nagaraja Rudrapatna, Phoenix, AZ (US); Curtis Swift, Phoenix, AZ (US); Philip Smalley, Phoenix, AZ (US); Liangyu Wang, Phoenix, AZ (US); Tim Ewing, Phoenix, AZ (US); Duane M. Peterson, Phoenix, AZ (US)

(73) Assignee: HONEYWELL AEROSPACE US LLC, Phoenix, AZ (US)

( * ) Notice: Subject to any disclaimer, the term of this patent is extended or adjusted under 35 U.S.C. 154(b) by 0 days.

(21) Appl. No.: 18/894,531

(22) Filed: Sep. 24, 2024

(65) Prior Publication Data

US 2026/0085632 A1 Mar. 26, 2026

(51) Int. Cl.
*F02C 7/12* (2006.01)
*F23R 3/00* (2006.01)

(52) U.S. Cl.
CPC ................ *F02C 7/12* (2013.01); *F23R 3/002* (2013.01); *F05D 2260/201* (2013.01)

(58) Field of Classification Search
CPC .......... F23R 3/002; F23R 3/283; F23R 3/346; F23R 2900/03041–03044; F02C 7/12; F05D 2260/201–203
See application file for complete search history.

(56) References Cited

U.S. PATENT DOCUMENTS

| | | | |
|---|---|---|---|
| 5,933,699 | A | 8/1999 | Ritter et al. |
| 8,096,135 | B2 | 1/2012 | Caples |
| 8,522,561 | B2 | 9/2013 | Rogers |
| 8,607,569 | B2 | 12/2013 | Helmick et al. |
| 9,239,167 | B2 | 1/2016 | Williams et al. |
| 10,822,972 | B2 | 11/2020 | Mukherjee et al. |
| 10,995,669 | B2 | 5/2021 | Myatlev |

(Continued)

FOREIGN PATENT DOCUMENTS

| | | | |
|---|---|---|---|
| EP | 0805308 | A1 | 11/1997 |
| EP | 2868973 | A1 | 5/2015 |
| JP | 5044034 | B2 | 10/2012 |

OTHER PUBLICATIONS

Soares, Gas Turbines: A Handbook of Air, Land, and Sea Applications, Dec. 31, 2008.

(Continued)

*Primary Examiner* — Andrew H Nguyen
(74) *Attorney, Agent, or Firm* — Ingrassia, Fisher & Lorenz LLP

(57) ABSTRACT

Systems and methods for a gas turbine engine with a combustor liner having a wall defining a combustion chamber. An injector module extends into the combustion chamber and includes an atomizer body. A shroud extends around the atomizer body. The shroud defines a coolant chamber within the shroud around the atomizer body configured to receive a coolant. The shroud includes an inner wall configured as an impingement baffle and that defines a plural number of jet holes. The shroud defines an outer wall around the inner wall with a cavity defined between the inner wall and the outer wall. The outer wall defines a plural number of effusion holes that extend between the cavity and the combustion chamber.

20 Claims, 6 Drawing Sheets

(56) References Cited

U.S. PATENT DOCUMENTS

| | | | | |
|---|---|---|---|---|
| 2007/0193272 | A1* | 8/2007 | Hebert | F23R 3/283 60/737 |
| 2011/0056206 | A1* | 3/2011 | Wiebe | F23D 11/36 60/730 |
| 2012/0031098 | A1 | 2/2012 | Ginessin et al. | |
| 2016/0258628 | A1 | 9/2016 | Ginessin et al. | |
| 2018/0223681 | A1 | 8/2018 | Gallier et al. | |
| 2022/0074595 | A1 | 3/2022 | Fauvet et al. | |

OTHER PUBLICATIONS

Sonu Kumar, Darshan D. Rathod, and Saptarshi Basu, Experimental investigation of performance of high-shear atomizer with discrete radial-jet fuel nozzle: mean and dynamic characteristics, Oct. 22, 2022.

World Pumps, KSB's 3D-printed containment shroud for mag-drive pumps, Apr. 9, 2024.

* cited by examiner

GAS TURBINE ENGINE FUEL ATOMIZER SHROUD COOLING

STATEMENT REGARDING FEDERALLY SPONSORED RESEARCH OR DEVELOPMENT

This invention was made with Government support under contract number 693KA9-21-T-00004 awarded by the Federal Aviation Administration. The Government has certain rights in this invention.

TECHNICAL FIELD

The present disclosure generally relates to gas turbine engines, and more particularly relates to enhanced cooling features for fuel atomizer shrouds of gas turbine engines.

BACKGROUND

Gas turbine engines may be employed to power various devices. For example, a gas turbine engine may be employed to power a mobile platform, such as aircraft, land vehicles, sea vehicles and other machines. Generally, gas turbine engines have an engine core, in which gas is combusted to generate a hot combustion gas flow. Certain components of the gas turbine engine, such as the combustor liner and related components, include portions that experience the full effect of the hot combustion gas flow. One such component is a fuel atomizer shroud. The shroud is immersed into the combustor housing and protects the fuel atomizer body.

The fuel atomizer shroud is exposed to high heat loads and as such, may be subject to heat exposure stress if not sufficiently protected and/or cooled. Thermal barrier coatings may be employed to protect the shroud and in certain applications additional protective measures may be needed.

Accordingly, it is desirable to provide improved heat protection for fuel atomizer shrouds. Furthermore, other desirable features and characteristics of the inventive subject matter will become apparent from the subsequent detailed description of the inventive subject matter and the appended claims, taken in conjunction with the accompanying drawings and this background of the inventive subject matter.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In a number of embodiments, systems and methods for a gas turbine engine with a combustor liner provide cooling of a fuel atomizer shroud and have a wall defining a combustion chamber. An injector module extends into the combustion chamber and includes an atomizer body. A shroud extends around the atomizer body. The shroud defines a coolant chamber within the shroud around the atomizer body and is configured to receive a coolant. The shroud includes an inner wall configured as an impingement baffle and the inner wall defines a plural number of jet holes. The shroud defines an outer wall around the inner wall with a cavity defined between the inner wall and the outer wall. The outer wall defines a plural number of effusion holes that extend between the cavity and the combustion chamber.

In a number of other embodiments, a system for a gas turbine engine includes a combustor liner having a wall defining a combustion chamber. An injector module extends into the combustion chamber, and the injector module includes an atomizer body. A shroud extends around the atomizer body and defines a compartment around the atomizer body within the combustion chamber. The compartment is a coolant chamber within the shroud around the atomizer body and operates to receive a coolant. The shroud includes an inner wall configured as an impingement baffle and the inner wall defines a plural number of jet holes. The shroud includes an outer wall defined around the inner wall with a cavity defined between the inner wall and the outer wall. The outer wall defines a plural number of effusion holes that extend between the cavity and the combustion chamber. The inner wall is configured as a first cup surrounding the atomizer body and the outer wall is configured as a second cup surrounding the first cup.

In a number of additional embodiments, a method of manufacturing a gas turbine engine with an injection module having a shroud, includes forming a combustor liner having a wall defining a combustion chamber. An injector module is assembled to extend into the combustion chamber, and the injector module includes an atomizer body. A shroud is extended around the atomizer body, where the shroud defines a coolant chamber within the shroud around the atomizer body that is configured to receive a coolant. An inner wall of the shroud is included and is configured as an impingement baffle, where the inner wall defines a plural number of jet holes. An outer wall of the shroud is formed around the inner wall with a cavity defined between the inner wall and the outer wall, where the outer wall defines a plural number of effusion holes that extend between the cavity and the combustion chamber. An extension is formed from the inner and the outer walls, and then removed.

BRIEF DESCRIPTION OF DRAWINGS

The present disclosure will hereinafter be described in conjunction with the following drawing figures, wherein like numerals denote like elements, and wherein.

DETAILED DESCRIPTION

Figure 1:
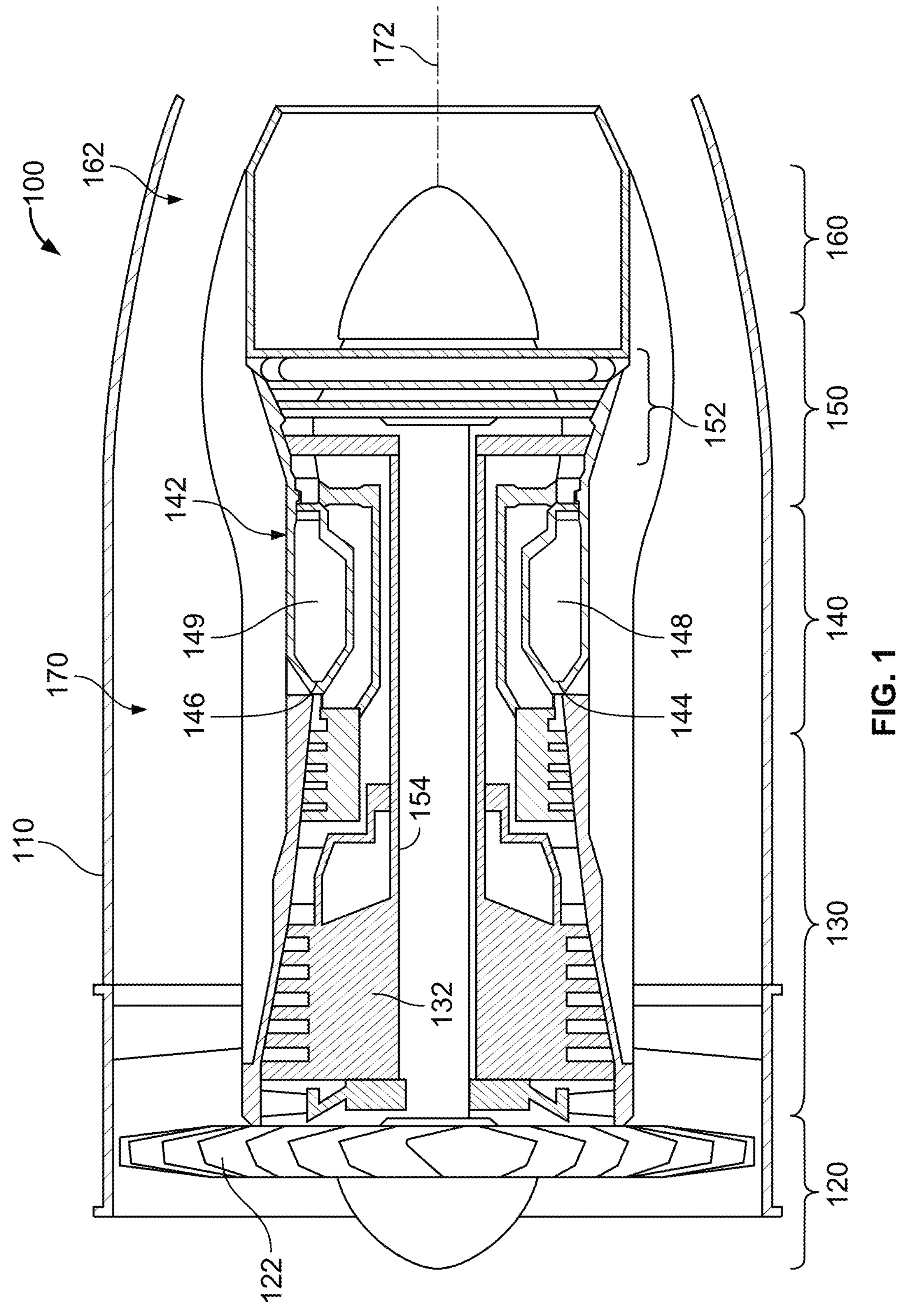
FIG. 1 is a schematic, cross sectional illustration of a gas turbine engine, according to an exemplary embodiment.

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

As used herein, the term "axial" refers to a direction that is generally parallel to or coincident with an axis of rotation, axis of symmetry, or centerline of a component or components. For example, in a cylinder or disc with a centerline and generally circular ends or opposing faces, the "axial" direction may refer to the direction that generally extends in parallel to the centerline between the opposite ends or faces. In certain instances, the term "axial" may be utilized with respect to components that are not cylindrical (or otherwise radially symmetric). For example, the "axial" direction for a rectangular housing containing a rotating shaft may be viewed as a direction that is generally parallel to or coincident with the rotational axis of the shaft. Furthermore, the term "radially" as used herein may refer to a direction or a relationship of components with respect to a line extending outward from a shared centerline, axis, or similar reference, for example in a plane of a cylinder or disc that is perpendicular to the centerline or axis. In certain instances, components may be viewed as "radially" aligned even though one or both of the components may not be cylindrical (or otherwise radially symmetric). Furthermore, the terms "axial" and "radial" (and any derivatives) may encompass directional relationships that are other than precisely aligned with (e.g., oblique to) the true axial and radial dimensions, provided the relationship is predominantly in the respective nominal axial or radial direction. As used herein, the term "substantially" denotes within 5% to account for manufacturing tolerances. Also, as used herein, the term "about" denotes within 5% to account for manufacturing tolerances.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

The exemplary embodiments discussed herein provide systems and methods for a gas turbine engine combustor that has a fuel atomizer assembly extending into the combustion chamber. The fuel atomizer assembly has a shroud that is exposed to the combustion heat. The shroud has a double wall architecture that includes an inner wall acting as an impingement baffle with jet holes, and includes an outer wall with effusion holes that provide film cooling of the surface of the shroud exposed to the combustion heat. The cooling air supplied for impingement is re-used for the film cooling. As a result, cooling air requirements are minimized while cooling effectiveness/heat extraction is maximized through the impingement-effusion cooling strategy.

Referring to FIG. 1, a schematic, cross-sectional illustration of a gas turbine engine 100 is depicted according to an exemplary embodiment. The gas turbine engine 100 may be used in any of a variety of applications. The gas turbine engine 100 may generally be contained in an engine case 110 and may include an inlet section 120, a compression section 130, a combustion section 140, a turbine section 150, and an exhaust section 160. The rotating parts of the gas turbine engine 100 rotate, such as on a shaft 154, about an axis 172.

The inlet section may, in some embodiments, include a fan 122, which draws in and accelerates at least a portion of the air directed to the compression section 130. A fraction of the accelerated air from the fan 122 is directed through a bypass section 170. The remaining fraction of air from the fan 122 is directed into the compression section 130. The compression section 130 may include a series of compressors 132 that raise the pressure of the air received from the inlet section 120. The compressors 132 then direct the compressed air to the combustion section 140. In the combustion section 140, the high pressure air is mixed with injected fuel and combusted. The combustion section 140 includes a combustor 142 that, in the current embodiment, is generally formed from one substantially cylindrical and/or conical combustor liner 144 attached to a dome 146. Air from the compression section 130 is generally directed into the combustor liner 144, which contains the combustion process in a combustion chamber 148. Some of the air from the compression section 130 is directed around the outside of the combustor liner 144 through a passage 149. After the combustion section 140, the combusted air is directed into the turbine section 150, which includes a series of turbines 152 to extract energy from the combusted air, which is then exhausted through the exhaust section 160.

Figure 2:
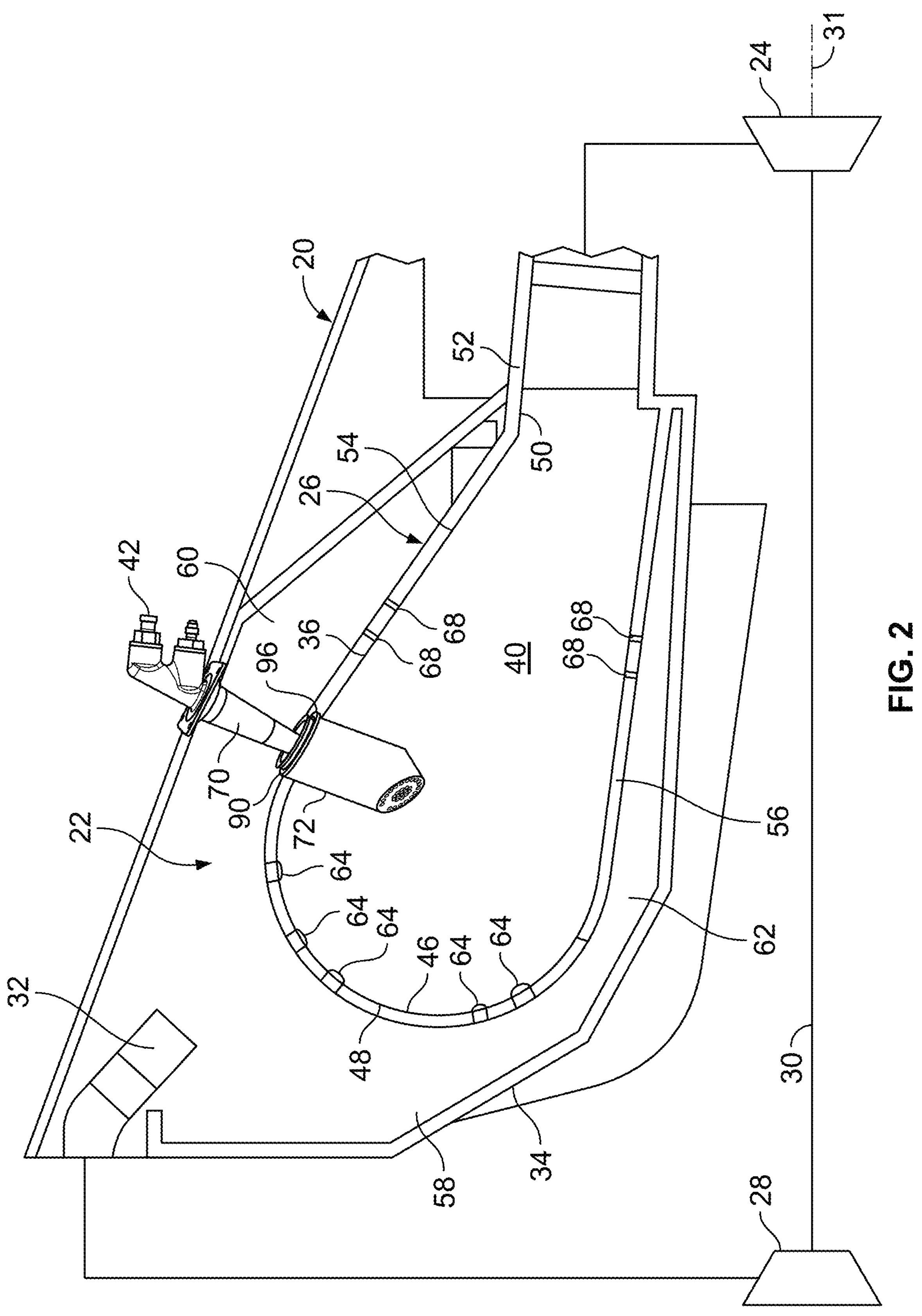
FIG. 2 is a schematic cross-sectional view of a combustion system of a gas turbine engine in accordance with an exemplary embodiment.

Referring additionally to FIG. 2, a cross-sectional view of a combustor area of an engine 20, which may be the gas turbine engine 100, shows a combustion system 22 in accordance with an exemplary embodiment. For purposes of the current example, the engine 20 is a turbofan type of gas turbine engine, with a turbine 24 that achieves mechanical energy from combustion of air and fuel in a combustor 26, which may be the combustor 142. The combustor 26 mixes admitted air with fuel and ignites the resulting mixture to generate high energy combustion gases that are then directed into the turbine 24, which may be the turbines 152. The mechanical energy from the turbine 24 is used to drive a compressor 28, which may be the compressors 132 and which may be embodied in the form of a ducted fan driven by the turbine 24 through a shaft 30. The shaft 30 defines an axis 31 (which may be the axis 172) around which the compressor 28 and the turbine 24 rotate. The compressor 28 pressurizes air for use in the combustor 26 and generally accelerates air through the engine 20, which may contribute to thrust. Air is delivered from the compressor 28 to the combustor 26 through an air discharge 32. Compressed air is discharged into the combustor's case 34. Combustion is contained within a liner 36 which is disposed in the case 34. The combustor 26 is an annular type, with the liner 36 and the case 34 encircling the shaft 30. Accordingly, the liner 36 defines a single annular shaped combustion chamber 40 that extends around the axis 31. An injector module 42 extends into the combustion chamber 40 for the introduction of air and/or fuel. Given the combustion chamber 40 is annular in shape extending around the shaft 30 as defined by the liner 36, it will be appreciated that a number of injector modules are disposed around its circumference. In a number of embodiments, a circumferential array of injector modules 42 is disposed around the combustion chamber 40. These injector modules 42 may be equally angularly spaced about the annular combustion chamber 40. In the current embodiment, the number of injector modules 42 may be sixteen, although the number will vary with the application. In general, air from the compressor 28 is supplied into the case 34, and air and fuel are delivered into the combustion chamber 40 and ignited, such as by an igniter. In addition to the air supplied to the combustion chamber 40 through the injector module 42, air passes from within the case 34 into the combustion chamber 40 through various openings in the liner 36.

In the exemplary embodiment of FIG. 2, the liner 36 includes a dome 46 at its upstream end 48 located toward the compressor 28, and an exhaust opening 50 at its exit end 52 located toward the turbine 24. An axial direction is defined between the upstream end 48 and the exit end 52, and is parallel to the axis 31. Between the dome 46 and the exhaust opening 50, the liner 36 includes a ring shaped outer liner wall 54 and a ring shaped inner liner wall 56, each of which encircles the axis 31. The outer liner wall 54 extends around the inner liner wall 56 to define the annular combustion chamber 40. Compressed air enters the case 34, which defines an air passage 58 leading to the liner 36. The air flows between the case 34 and the liner 36 through an outer air plenum 60 and an inner air plenum 62 (defining the air passage 58). As will be appreciated, air enters the combustion chamber from the air plenums 60, 62 through the injector module 42, through effusion holes 64 distributed in the dome 46, the outer liner wall 54 and the inner liner wall 56, and through quench jets 68. In one example, the contributions of admitted air into the combustion chamber 40 include air entering through the injector modules 42, the quench jets 68, and the effusion holes 64.

In the exemplary embodiment, the combustor 26 may be an annular RQL gas turbine engine combustor. In other embodiments, the combustor 26 may be another type of combustor. In embodiments, a "rich-burn" condition in a main zone enhances the stability of the combustion reaction by producing and sustaining a high concentration of energetic hydrogen and hydrocarbon radical species. Rich burn means more fuel is introduced than a stoichiometric amount. Rich burn conditions may minimize the production of NOx due to the relative low temperatures and low population of oxygen containing intermediate species. From the main zone to a quench zone, the combustion regime may shift rapidly from rich to lean without dwelling at a high NOx production state. This may be accomplished by moving from a rich burn state where more fuel is present than a stoichiometric amount to a lean burn state where less fuel is present than a stoichiometric amount. During operation at a high power state, such as during aircraft takeoff where the engine 20 operates at or near full power, a portion of the pressurized air from the compressor 28 enters the main zone of the combustion chamber through the injector module 42 and the effusion holes 64. The admitted air mixes with a quantity of fuel sufficient to achieve the rich burn condition in the main zone. Fuel is supplied through the injector module 42. Operating the one zone fuel lean results in low NOx production, while providing pre-heating for combustion in the main zone. Operating the main zone under fuel rich conditions and with a low residence time due to the relatively small volume and air flow, also results in low NOx production. The rich stoichiometry of the fuel-air mixture in the main zone reduces NOx formation.

Moving from the main zone to the quench zone, combustion conditions transition from fuel rich to fuel lean rapidly. Air is admitted through the quench jets 68 to make the conversion. The combustion gases from the rich burn main zone, which include unburned fuel, enter the quench zone. Air is admitted from the inner and outer air plenums 60, 62 and into the quench zone through the quench jets 68 in the outer and inner liner walls 54, 56, respectively. Flow through the quench jets 68 is referred to as quench air because it rapidly mixes with the combustion gases to move them from a stoichiometrically rich state to a stoichiometrically lean state. This supports further combustion and releases additional energy from the fuel. The combustion gases passing through the quench zone are mixed rapidly to change from a fuel-rich state to a fuel-lean state. In one example, the quench jets 68 admit 38 percent of the compressor discharge air. Combined with the low volume of the quench zone, the admitted air rapidly creates the fuel lean conditions. In addition, the quench jets 68 are configured to produce radially penetrating air jets that project into the combustion chamber 40 for rapid mixing within the quench zone. Some of the air jets admitted through the quench jets 68 may radially penetrate the combustion chamber 40 more than 50% of its radial depth. Following quench, the combustion products are consumed under fuel-lean conditions, where the combustion process concludes. The exhaust gases move through the exhaust opening 50 and on the turbine 24. Accordingly, precise metering of air flow into the combustion chamber 40 is desired.

To supply fuel, the injector module 42 has, in the current embodiment, an atomizer 70 that is of the dual tip type. The atomizer 70 may be configured in a pilot and main arrangement, or in another configuration and are directed to inject into different zones of the combustion chamber 40. The injector module 42 includes a shroud 72 that surrounds and protects the atomizer 70. The shroud 72 is immersed into the combustor 26 and is directly exposed to the heat within the combustion chamber 40, with the atomizer 70 shielded from the heat.

Figure 3:
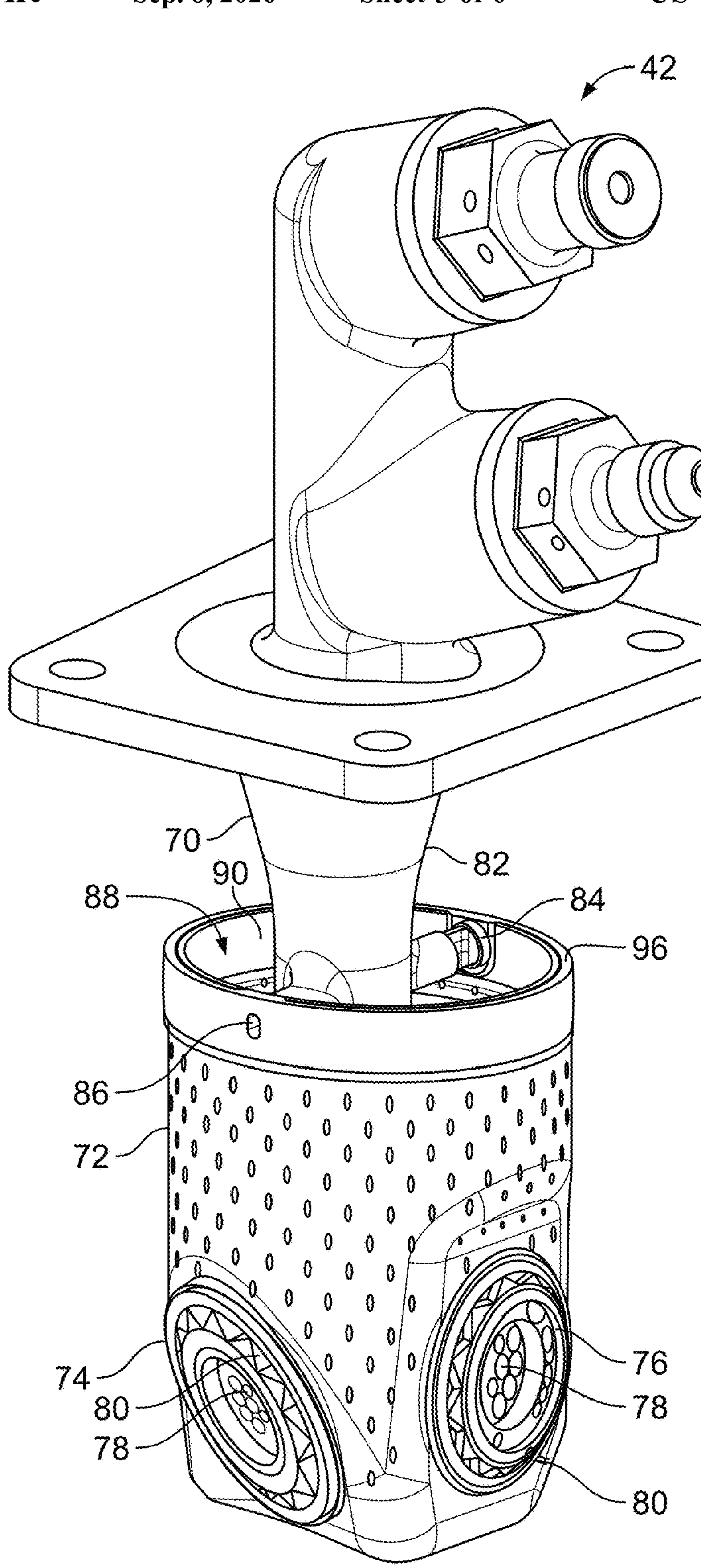
FIG. 3 is a perspective illustration of a fuel atomizer assembly of the gas turbine engine of FIGS. 1 and 2, in accordance with an exemplary embodiment.

Referring additionally to FIG. 3, the shroud 72 defines a compartment 88 within which the atomizer body 82 extends. The compartment 88 comprises a coolant chamber that receives cooling air in a separated space within the combustion chamber 40 and around the atomizer body 82. The injector module 42 includes dual tips 74, 76 through which fuel nozzles 78 and air jets 80, which may include swirlers, open into the combustion chamber 40. The shroud 72 is held to the atomizer body 82 by pins 84, 86.

The shroud 72 is subjected to high heat loads and so a cooling strategy is employed that ensures its integrity is maintained, and that the atomizer body 82 is protected from excessive heat loads. For example, the temperatures in the combustion chamber 40 may exceed 1800 degrees Celsius.

An added factor is that the cooling strategy minimizes the introduction of additional air into the combustion chamber 40 so as to not interfere with the sophisticated combustion performance. In other words, the cooling strategy uses as little air as possible, while optimizing the cooling effect on the shroud 72. The current embodiment employs effusion and thermal barrier (film) cooling along with impingement cooling to provide optimal results with unique component geometry.

Figure 4:
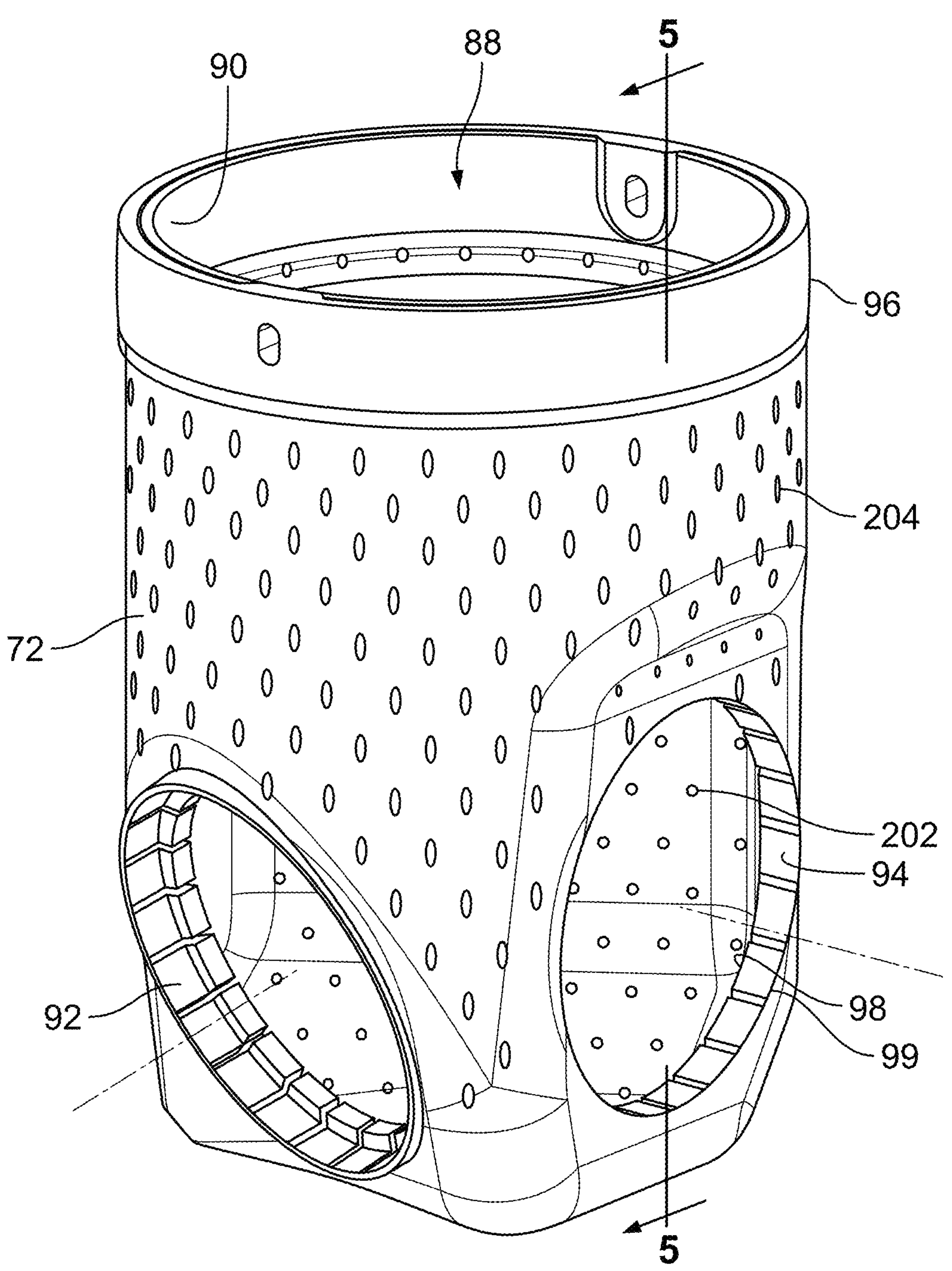
FIG. 4 is a perspective illustration of the shroud of the fuel atomizer assembly of FIG. 3, according to an exemplary embodiment.

Referring additionally to FIG. 4, the shroud 72 is shown in isolation. The shroud 72 includes an opening 90 through which the atomizer body 82 extends (FIGS. 2 and 3). The shroud 72 also includes openings 92, 94 (injector openings) for the tips 74, 76 to receive the injector faces to feed the combustion chamber 40. The shroud 72 includes a collar 96 that interfaces (FIG. 3) with the combustor liner 36, such as through a boss and a grommet. Coolant (air) flows into the compartment 88 from the air passage 58. In general, the shroud 72 includes a double wall structure with an inner wall 98 and an outer wall 99.

Figure 5:
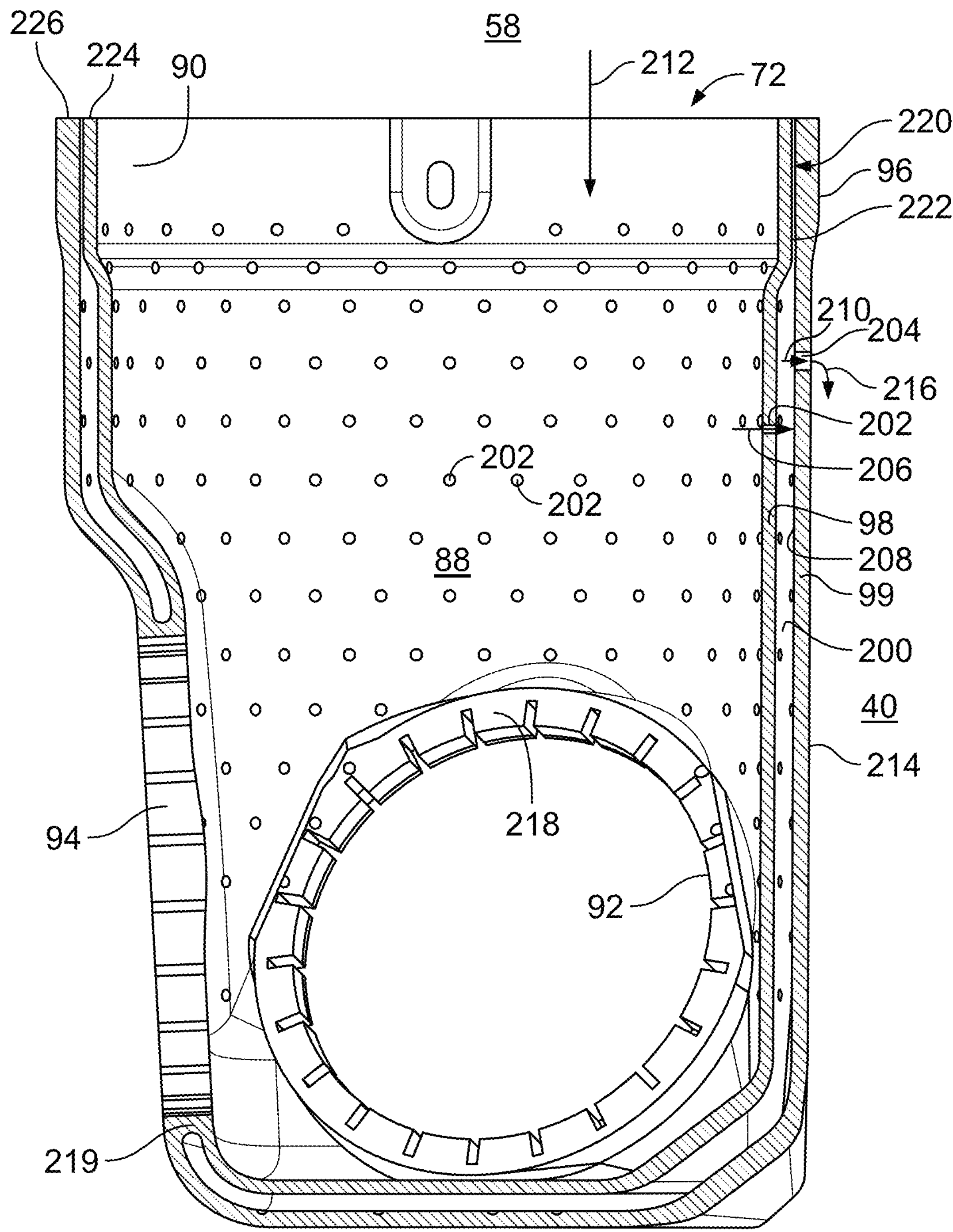
FIG. 5 is a sectional view taken generally through the line 5-5 of FIG. 4, in accordance with an exemplary embodiment.
Figure 6:
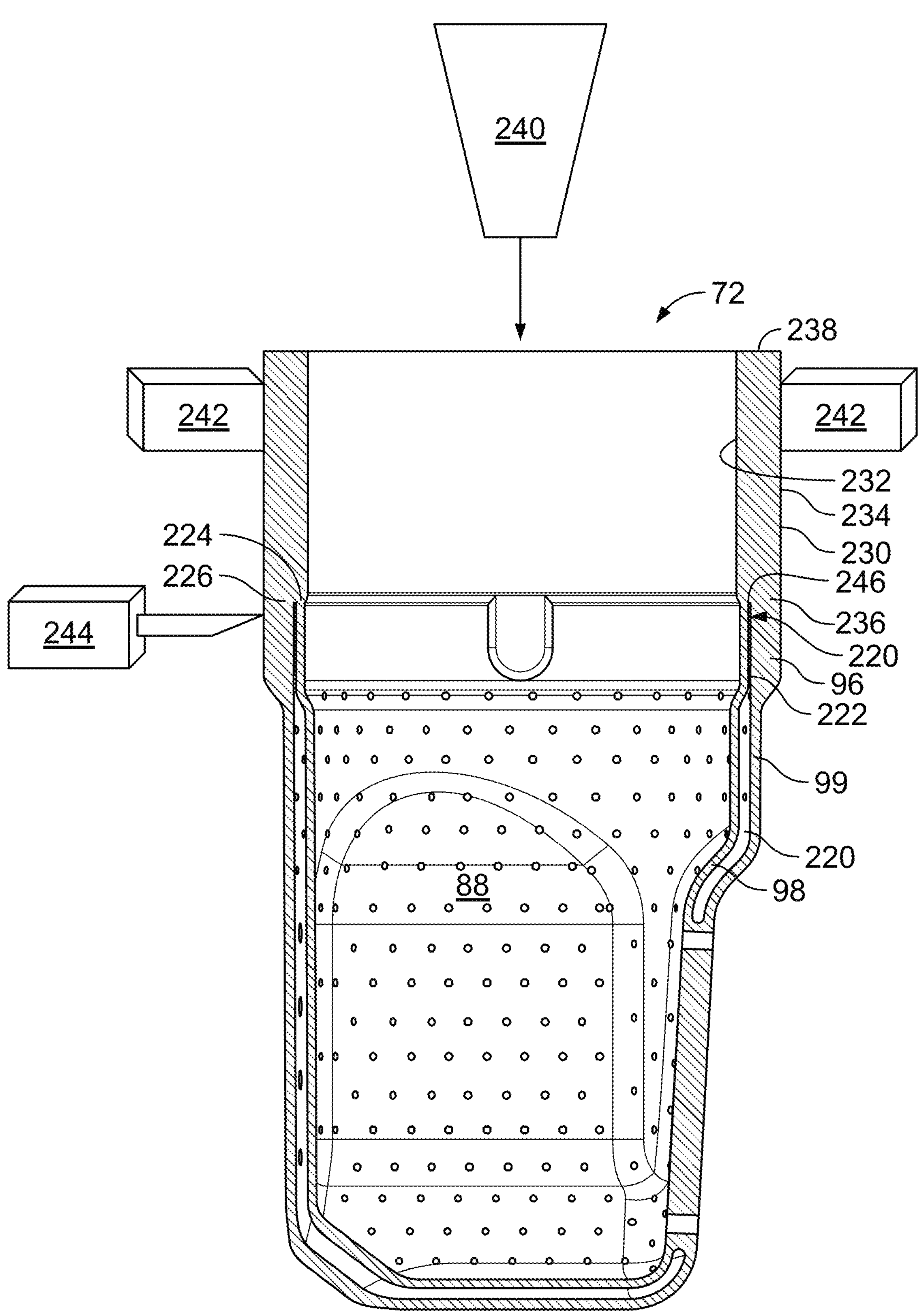
FIG. 6 is a sectional illustration of the shroud of FIG. 4 during an in-process fabrication step, according to an exemplary embodiment.

Referring additionally to FIG. 5, a cavity 200 is defined between the inner wall 98 and the outer wall 99. The shroud 72 may be described as a cup (made of the inner wall 98) withing a larger cup (made of the outer wall 99), with the cavity 200 in-between. The inner wall 98 has a number of jet holes 202 that provide openings between the compartment 88 and the cavity 200. The outer wall 99 has a plural number of effusion holes 204 that provide openings between the cavity 200 and the combustion chamber 40.

The inner wall 98 is configured as an impingement baffle/wall and defines a plural number of the jet holes 202. The jet holes 202 admit the coolant/air from the compartment 88 into the cavity 200 as a flow (jet flow 206) that impinges on the outer wall 99. The jet flow 206 through the jet holes 202 impinges on the inner surface 208 of the outer wall 99, which faces the cavity 200, providing impingement cooling to extract heat from the outer wall 99 and to reduce its wall temperature. The jet holes 202 may be tailored to provide high speed jet impingement on the inner surface 208 creating a thin boundary layer, and thus a high heat transfer.

The air, spent through the jet holes 202 as the jet flow 206, is then driven through the effusion holes 204 of the outer wall 99 as effusion flow 210. The cooling air supplied by the compressor 28 to the air passage 58 flows into the compartment 88 through the opening 90 as cooling flow 212, and then through the inner wall 98 via the jet holes 202 into the cavity 200, and after that, through the outer wall 99 via the effusion holes 204 into the combustion chamber 40. The effusion flow 210 is directed over the outer surface 214 of the outer wall 99 providing film cooling to extract additional heat from the outer wall 99 and to further reduce wall temperature. The outer surface 214 is a combustion chamber 40 facing surface, exposed to heat in the combustion chamber 40. The film cooling is effected by film cooling flow 216 made to pass by means of the effusion holes 204 over the outer surface 214 generating a relatively cool film layer which acts as a thermal barrier in-between the heat in the combustion chamber 40 and the outer wall 99. By reusing the impingement cooling air as effusion/film cooling air, cooling is maximized while minimizing the amount of air added to the combustion chamber 40 and thus minimizing the effect on the combustion process.

The shroud 72 includes the outer wall 99 defined around the inner wall 98, which defines the compartment 88. The cavity 200 is defined between the inner wall 98 and the outer wall 99. A plural number of jet holes 202 extend through the inner wall 98 between the compartment 88 and the cavity 200. A plural number of effusion holes 204 extend between the cavity 200 and the combustion chamber 40. The impingement+effusion cooling provides a two-staged heat extraction from the shroud 72. The heat extraction may be tailored for optimum heat extraction for the application by selecting the locations of the jet holes 202 and the effusion holes 204, by selecting the sizes of the jet holes 202 and the effusion holes 204, and by selecting the density of the jet holes 202 and the effusion holes 204. In addition, the spacing of the jet holes 202 and the effusion holes 204 may be uniform or non-uniform depending on the cooling requirements of the application.

As shown in FIG. 5, the cavity 200 extends around the inner wall 98. Around the openings 92, 94 the inner wall 98 joins with the outer wall 99 to form rings 218, 219 to receive the tips 74, 76. Otherwise, a double wall architecture is maintained to avoid over-constraining the shroud 72 and to permit relative movement of the inner wall 98 and the outer wall 99 during thermal expansion and contraction.

At the area of the collar 96, the inner wall 98 and the outer wall 99 are separated to allow relative movement. A sliding interface 220 is provided with a gap 222 between the inner wall 98 and the outer wall 99. The gap 222 defines an annular space that is concentric with the opening 90. To reduce leakage out of the cavity 200, the gap 222 may be minimal and/or minimalized, such as where the inner wall 98 and the outer wall 99 may touch or may nearly touch. In some embodiments, the gap 222 may be sized to ensure the rim 224 of the inner wall 98 remains moveable relative to the rim 226 of the outer wall 99, e.g., to maintain the sliding interface 220 through the entire thermal cycle. Apart from the gap 222 and the rings 218, 219, spacing is maintained between the inner wall 98 and the outer wall 99 to maximize the area covered by the cavity 200.

Manufacture of the shroud 72 to provide a minimal sized yet functional gap 222 may be achieved by methods such as 3D printing. For example, an additive manufacturing machine 240, such as utilizing powder bed fusion, directed energy deposition, or another process may be employed. The shroud 72 may be formed with an extension 230 that extends away from the collar 96 on an opposite side from the cups formed by the inner wall 98 and the outer wall 99. The extension 230 is a cylindrical section that is solid between its inner surface 232 and its outer surface 234 and from its proximate end 236 (proximate the collar 96) to its terminal end 238 (distant from the collar 96). The proximate end 236 is disposed at the end 246 of the gap 222. The end 236 being located at the rims 224, 226. Following printing of the shroud 72 with the extension 230 being integral, the shroud 72 may be further processed by a number of steps. For example, in no particular order, the extension 230 may be removed, and the openings 92, 94 may be formed and/or finished. In some embodiments, the extension 230 may be used as a clamping section to secure the shroud 72, such as by a clamp 242, and the openings 92, 94 may be machined. Following completion of the openings 92, 94, the extension 230 may be removed such as by shearing, cutting, or otherwise, such as by a blade 244. The printing of the shroud 72 with the extension 230 enables manufacture with a tightly toleranced gap 222 to ensure the proper operation of the sliding interface 220 and to ensure the rims 224, 226 are separate.

Accordingly, systems and methods are provided for cooling a shroud of a fuel module/atomizer in a gas turbine engine. The shroud includes an inner wall configured as an impingement baffle that defines a plural number of jet holes that cool an outer wall by impingement cooling. The outer wall has a plural number of effusion holes that cool the outer wall by effusion/film cooling. The impingement and effusion cooling is achieved through a double wall architecture to enhance cooling effectiveness for the same mass air flow. In the double wall design, the cooling air first impinges on the outer wall. Spent air then flows through effusion holes in the outer wall to form a cooling film on the hot side surface. Up to 150 F reduction temperature may be seen when impingement+effusion cooling is employed verses single wall effusion cooling. The cooling approach may be tailored by hole pattern changes for both impingement and effusion simultaneously, thereby allowing multiple strategies to address local hot spots. The double wall cooling functions well when the hot/outer and cool/inner walls are allowed to grow independently (i.e., low stresses and higher life). The two walls are integral at the two swirler interface locations where the two fuel atomizer tips exit while they are free to grow relative to each other at the other end. By ensuring the gap between two walls at their rims is small, leakage flow is kept to a minimum and thermal stresses are minimized.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A system for a gas turbine engine, the system comprising:

a combustor liner having a wall defining a combustion chamber, wherein an air plenum is defined at an outside of, and around, the combustor liner;

an injector module extending into the combustion chamber, the injector module including an atomizer body; and a shroud extending around the atomizer body, the shroud defining a coolant chamber within the shroud that is around the atomizer body and is configured to receive a coolant, wherein the shroud includes an inner wall configured as an impingement baffle that defines a plural number of jet holes, wherein the shroud includes an outer wall defined around the inner wall with a cavity defined between the inner wall and the outer wall, wherein the shroud, including the inner wall and the outer wall, is cup shaped with a side that extends from a first end at the wall of the combustor liner into the combustion chamber to a second end defined by an end wall in the combustion chamber, the side and the end wall defined by both the inner wall and the outer wall, with the cavity defined between the inner wall and the outer wall at both the side and the end wall, wherein at the first end the shroud includes a collar at which the inner wall has a first rim and the outer wall has a second rim, the shroud interfacing with the wall of the combustor liner through the collar, wherein the inner wall defines the coolant chamber and includes an opening defined by the first rim through which the coolant chamber is open to the air plenum, wherein the outer wall defines a plural number of effusion holes that extend between the cavity and the combustion chamber.

2. The system of claim 1, wherein the jet holes define openings between the coolant chamber and the cavity.

3. The system of claim 1, wherein the jet holes are configured to direct coolant jets to impinge on the outer wall.

4. The system of claim 1, wherein coolant jets are delivered through the jet holes and supply the coolant to the cavity, where the coolant is then directed through the effusion holes, wherein the effusion holes generate a film layer which acts as a thermal barrier between heat in the combustion chamber and the outer wall.

5. The system is claim 1, wherein the comprising a compressor that is configured to supply compressed air to the air plenum, wherein the compressed air comprises the coolant.

6. The system of claim 1, wherein the shroud couples with the combustor liner at the collar, wherein the collar includes a sliding interface that is defined between the inner wall and the outer wall, with the first rim and the second rim providing a gap with the sliding interface, wherein the gap is smaller than a width of the cavity between the inner wall and the outer wall so as to enable sliding between the first rim and the second rim and to maintain separation between the inner wall and the outer wall at the cavity.

7. The system of claim 1, wherein the jet holes are configured to supply the coolant into the cavity for impingement cooling of the outer wall, and wherein the effusion holes are configured to supply the coolant to the combustion chamber for film cooling of a combustion chamber facing surface of the outer wall.

8. The system of claim 1, wherein the coolant is supplied through both the inner wall and the outer wall to effect both impingement cooling and film cooling of the outer wall.

9. The system of claim 1, wherein the shroud includes the collar configured for coupling with the combustor liner and wherein the inner wall includes an offset toward the outer wall at the collar.

10. The system of claim 1, wherein the shroud defines an injector opening through the side, wherein the cavity is defined between the injector opening and the first end and also between the injector opening and the second end, wherein the side forms a ring around the injector opening where the inner wall and the outer wall join together, and wherein the atomizer body includes a fuel nozzle disposed in the injector opening.

11. A system for a gas turbine engine, the system comprising:

a combustor liner having a wall defining a combustion chamber, wherein an air plenum is defined at an outside of, and around, the combustor liner;

an injector module extending into the combustion chamber, the injector module including an atomizer body; and a shroud extending around the atomizer body defining a compartment around the atomizer body within the combustion chamber, the compartment comprising a coolant chamber within the shroud around the atomizer body that is configured to receive a coolant, wherein the shroud includes an inner wall configured as an impingement baffle and defining a plural number of jet holes, wherein the shroud includes an outer wall defined around the inner wall with a cavity that is defined between the inner wall and the outer wall and the outer wall defining a plural number of effusion holes that extend between the cavity and the combustion chamber, wherein the shroud, including the inner wall and the outer wall, is cup shaped with a side that extends from a first end at the wall of the combustor liner into the combustion chamber to a second end defined by an end wall in the combustion chamber, the side and the end wall defined by both the inner wall and the outer wall, with the cavity defined between the inner wall and the outer wall at both the side and the end wall, wherein at the first end the shroud includes a collar at which the inner wall has a first rim and the outer wall has a second rim, the shroud interfacing with the wall of the combustor liner through the collar, wherein the inner wall defines the coolant chamber and includes an opening defined by the first rim through which the coolant chamber is open to the air plenum, wherein the inner wall is configured as a first cup surrounding the atomizer body and the outer wall is configured as a second cup surrounding the first cup.

12. The system of claim 11, wherein the jet holes define openings through the inner wall that extend between the coolant chamber and the cavity.

13. The system of claim 11, wherein the jet holes are configured to direct coolant jets to impinge on the outer wall to effect impingement cooling of the outer wall.

14. The system of claim 11, wherein coolant jets through the jet holes supply the coolant to the cavity, wherein the coolant is configured to then flow through the effusion holes to effect film cooling of the outer wall, wherein the effusion holes generate a film layer which acts as a thermal barrier between heat in the combustion chamber and the outer wall.

15. The system is claim 11, comprising a compressor that is configured to supply compressed air for combustion within the combustor and to the air plenum for cooling, wherein the compressed air comprises the coolant.

16. The system of claim 11, wherein the shroud couples with the combustor liner at a collar, wherein the collar includes a sliding interface with a gap that is defined between the inner wall and the outer wall, and wherein the shroud includes a ring defining an injector opening where the inner wall joins with the outer wall, wherein spacing is maintained between the inner wall and the outer wall other than at the ring and the collar to maximize an area covered by the cavity, wherein the first rim and the second rim provide the sliding interface, wherein the gap is smaller than a width of the cavity between the inner wall and the outer wall so as to enable sliding between the first rim and the second rim and to maintain separation between the inner wall and the outer wall at the cavity.

17. The system of claim 11, wherein the jet holes are configured to supply the coolant into the cavity for impingement cooling of the outer wall, and wherein the effusion holes are configured to supply the coolant to the combustion chamber for film cooling of a combustion chamber facing surface of the outer wall to effect impingement and effusion-film cooling of the outer wall.

18. The system of claim 11, wherein the coolant is supplied through the compartment, the inner wall, and the outer wall to the combustion chamber.

19. The system of claim 11, wherein the shroud includes the collar configured for coupling with the combustor liner, and wherein the inner wall includes an offset toward the outer wall at the collar.

20. A method of manufacturing a gas turbine engine with an injection module having a shroud, the method comprising:

forming a combustor liner having a wall defining a combustion chamber;

defining an air plenum at an outside of, and around, the combustor liner;

assembling an injector module to extend into the combustion chamber, the injector module including an atomizer body;

extending a shroud around the atomizer body, the shroud defining a coolant chamber within the shroud around the atomizer body that is configured to receive a coolant;

forming an inner wall of the shroud configured as an impingement baffle, the inner wall defining a plural number of jet holes;

forming an outer wall of the shroud around the inner wall, with a cavity defined between the inner wall and the outer wall and the outer wall defining a plural number of effusion holes that extend between the cavity and the combustion chamber;

forming the shroud to include the inner wall and the outer wall, and in a cup shape with a side that extends from a first end at the wall of the combustor liner into the combustion chamber to a second end defined by an end wall in the combustion chamber, the side and the end wall defined by both the inner wall and the outer wall, with the cavity defined between the inner wall and the outer wall at both the side and the end wall;

including, at the first end the shroud, a collar at which the inner wall has a first rim and the outer wall has a second rim, and interfacing the shroud with the wall of the combustor liner through the collar second;

defining, by the inner wall, the coolant chamber and including an opening defined by the first rim through which the coolant chamber is open to the air plenum;

forming an extension from the inner and the outer walls; and removing the extension.

* * * * *